United States Patent

Katsuki et al.

[11] 4,427,743
[45] Jan. 24, 1984

[54] LAMINATED PANEL

[75] Inventors: Kazuo Katsuki, Takarazuka; Kazuo Shibaoka, Itami; Shunji Ohnishi; Takao Miwa, both of Nishinomiya, all of Japan

[73] Assignee: Nippon Sheet Glass Co., Ltd., Osaka, Japan

[21] Appl. No.: 379,015

[22] Filed: May 17, 1982

Related U.S. Application Data

[63] Continuation of Ser. No. 158,137, Jun. 10, 1980, abandoned.

[30] Foreign Application Priority Data

Mar. 27, 1980 [JP] Japan .................................. 55-40489

[51] Int. Cl.$^3$ .......................... B32B 17/06; B32B 27/36
[52] U.S. Cl. .............................. 428/424.6; 428/424.8; 428/442; 428/441; 428/412; 156/104
[58] Field of Search ................... 428/429, 424.8, 424.6, 428/424.4, 442, 425.5, 425.6, 426, 518, 520, 522, 213, 313, 412, 34, 926, 437, 517, 523, 918, 441, 339; 156/102, 99, 103, 105, 106, 104

[56] References Cited

U.S. PATENT DOCUMENTS 3,666,614 5/1972 Snedeker et al. .
4,081,581 3/1978 Littel, Jr. ...................... 428/425.6

FOREIGN PATENT DOCUMENTS 45-26861 7/1970 Japan .
50-59617 4/1975 Japan .
52-59617 5/1977 Japan .
53-19314 2/1978 Japan .
54-73859 6/1979 Japan .
54-73881 6/1979 Japan .

Primary Examiner—David A. Simmons
Assistant Examiner—Louis Falasco
Attorney, Agent, or Firm—Wenderoth, Lind & Ponack

[57] ABSTRACT

A laminated panel composed of a plastic sheet and a glass sheet bonded to each other through an adhesive layer having a thickness of not more than about 200 microns and composed of a thermoplastic resin having a softening point of less than about 100° C., containing substantially no plasticizer and being plastic at room temperature, said plastic sheet being composed of a resin having a higher softening point than said thermoplastic resin.

13 Claims, 8 Drawing Figures

Fig. 5-a
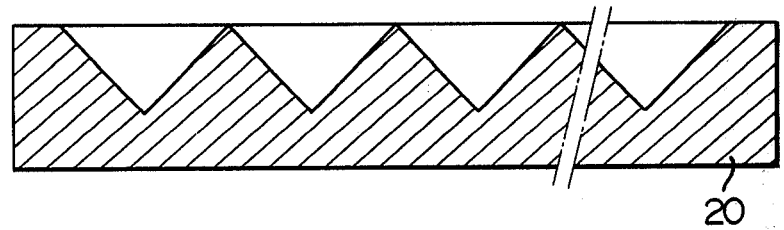
Fig. 5-b
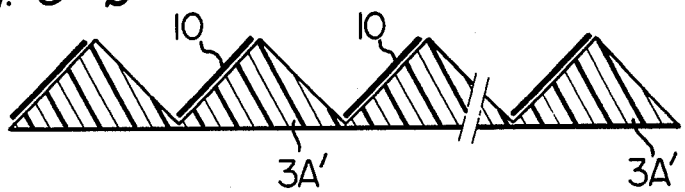
Fig. 5-c
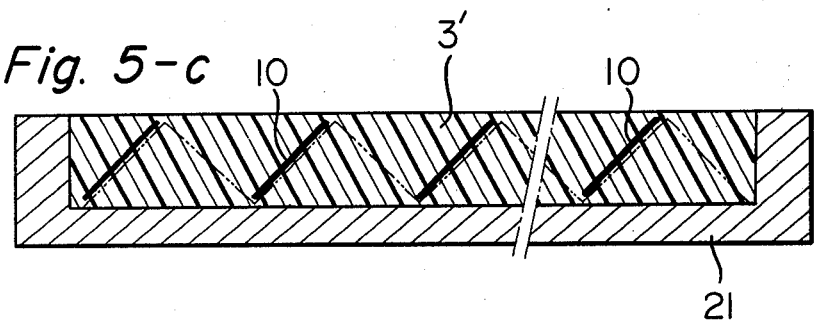
Fig. 6
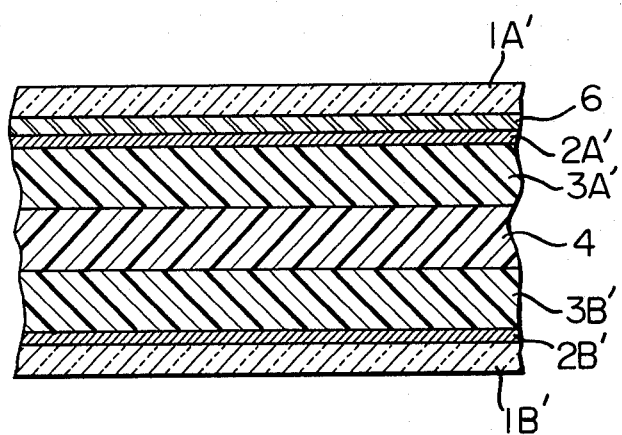

LAMINATED PANEL

This application is a continuation of Ser. No. 158,137, filed June 10, 1980, now abandoned.

FIELD OF INVENTION

This invention relates to a laminated panel. More specifically, it relates to a laminated panel composed of a plastic sheet and a glass sheet bonded to each other through an adhesive layer of a thermoplastic resin having specified properties and containing no plasticizer.

DESCRIPTION OF PRIOR ART

It has been well known that bonding of a glass sheet having superior chemical resistance and scratch resistance to a plastic sheet having light weight and superior breaking resistance gives a laminated panel having a combination of these properties.

The greatest problem with the production of such a laminated panel is that the plastic sheet and the glass sheet have different coefficients of thermal expansion. For example, when bonding a plastic sheet and a glass sheet to each other through a thermosetting resin, the assembly is cooled to room temperature following its heating for curing the thermosetting resin, and a high thermal stress remains in the bonded surface of the resulting laminated panel and thus causes a mechanical strain or an optical distortion in the laminated panel, or cracking or peeling occurs in the laminated panel.

In an attempt to solve this problem, various suggestions have been made in the past. For example, Japanese Laid-Open Patent Publication No. 73859/79 discloses a method for forming a laminated panel composed of two glass sheets and a thermosetting plastic sheet as an interlayer with a reduced residual strain between the interlayer and each of the glass sheets, which comprises first coating the inner surfaces of the two glass sheets with a thermoplastic adhesive such as polyvinyl butyral, pouring a liquid thermoplastic resin having a lower curing temperature than the heat sealing temperature of the thermoplastic adhesive between the two adhesive layers, and then heating the assembly to cure the thermosetting resin and to heat-seal the two glass sheets by the thermoplastic adhesive.

There is also known a laminated panel of a glass sheet and a plastic sheet in which a layer of an adhesive having a coefficient of thermal expansion close to that of the glass sheet is provided at a part near the glass sheet, and a layer of an adhesive having a coefficient of thermal expansion close to that of the plastic sheet is provided near the plastic sheet, and these adhesive layers are laminated to bond the glass sheet and the plastic sheet to reduce thermal stresses between the individual layers.

The aforesaid bonding method for the laminated panel includes many steps for bonding and still has problems to be solved in order to practice it industrially. Furthermore, the aforesaid laminated panels obtained by such a method have only limited applications because adhesive layers that can be used are limited. Moreover, the thickness of the adhesive layer itself generally increases, and therefore, in the case of a thin glass sheet, impact will easily result in breakage of the glass sheet.

Polyvinyl butyral is frequently used as an adhesive for laminated panels. In a method for producing a laminated panel by using polyvinyl butyral, an attempt to remove residual strains is known. Specifically, there is known a method which comprises first bonding a film of polyvinyl butyral to a glass sheet and then bonding a plastic sheet to the polyvinyl butyral film so as to cause a strain, which occurs owing to shrinkage of the plastic sheet at the time of bonding, to be absorbed by the polyvinyl butyral layer.

In the laminated panel having an adhesive layer of polyvinyl butyral, the polyvinyl butyral contains a large amount of a plasticizer. Accordingly, even when a strain can be removed by the aforesaid method, heating for heat sealing tends to cause the plasticizer to move from the plasticized polyvinyl butyral to the plastic sheet (for example, a frequently used polycarbonate or polyacrylate sheet). Furthermore, when the glass sheet is thin and the polyvinyl butyral layer is thick, the glass sheet tends to be readily broken by shock.

SUMMARY OF INVENTION

It is an object of this invention, therefore, to provide a laminated panel comprising a glass sheet, a plastic sheet and an adhesive layer for bonding these sheets, in which the generation of a residual strain between the glass sheet and the plastic sheet is reduced.

Another object of this invention is to provide a laminated panel having an adhesive layer which well absorbs external shock.

Still another object of this invention is to provide a laminated panel having an adhesive layer and a cushioning layer which well absorb strong external shock.

Yet another object of this invention is to provide a laminated panel in which the glass sheet does not easily break by external shock even when it is thin.

Still another object of this invention is to provide a laminated panel which does not develop a mechanical strain or an optical distortion and is free from deformation or cracking.

A further object of this invention is to provide a laminated panel having good transparency.

A still further object of this invention is to provide a laminated panel having the aforesaid properties, which is suitably used for shielding light or reflecting heat rays.

Other objects of this invention will become apparent from the following description.

In accordance with this invention, the objects and advantages of this invention are achieved by a laminated panel comprising a plastic sheet and a glass sheet bonded to each other through an adhesive layer having a thickness of not more than about 200 microns and composed of a thermoplastic resin having a softening point of less than about 100° C., containing substantially no plasticizer and being plastic at room temperature, said plastic sheet being composed of a resin having a higher softening point than said thermoplastic resin.

These objects and advantages of this invention, according to another aspect, are achieved by a laminated panel comprising a glass sheet forming an outermost layer, an adhesive layer having a thickness of not more than about 200 microns and composed of a thermoplastic resin having a softening point of less than about 100° C., containing substantially no plasticizer and being plastic at room temperature, a first plastic sheet, a cushioning layer and a second plastic sheet, said glass sheet being bonded to one surface of said first plastic sheet through said adhesive layer, and the other surface of said first plastic sheet being bonded to one surface of said second plastic sheet through said cushioning layer.

BRIEF DESCRIPTION OF DRAWINGS

FIGS. 1–4 and 6 are longitudinal sectional views of different embodiments of the laminated panel of this invention.

FIGS. 5-a, 5-b and 5c are cross-sectional views illustrating a process for producing a plastic sheet which can be used in forming the laminated panel of FIG. 4.

DESCRIPTION OF PREFERRED EMBODIMENTS

Figure 1:
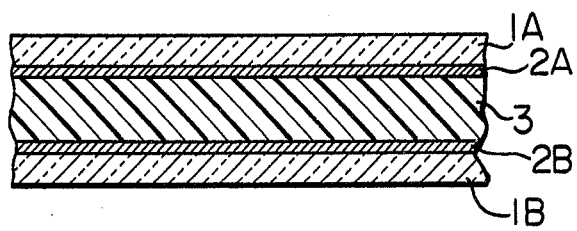

One characteristic feature of the laminated panel of this invention is that the adhesive layer is composed of a thermoplastic resin which has a softening point of less than about 100° C., is substantially free from a plasticizer and is plastic at room temperature, and has a thickness of not more than about 200 microns.

Since the thermoplastic resin as the adhesive layer between the glass sheet and the plastic sheet shows plasticity at room temperature, it reduces external shock under service conditions. Furthermore, since this thermoplastic resin has a relatively low softening point of less than about 100° C., it is not necessary to provide too large a temperature difference between the heat-sealing temperature which is higher than the softening point of the thermoplastic resin and the room temperature at which cooling subsequent to heat sealing is performed. The adhesive layer has plasticity at room temperature and the action of thermal stress causes it to show a plastic flow. Consequently, the strain attributed to the difference in the coefficient of thermal expansion between the glass sheet and the plastic sheet can be minimized, and a laminated panel free from mechanical strain, optical strain, deformation and cracks can be obtained. Moreover, since the thermoplastic resin does not contain a plasticizer, haze in the plastic sheet owing to the migration of plasticizer from the adhesive layer to the plastic sheet does not occur at the time of heat sealing, and therefore, a laminated panel having good transparency can be obtained.

It can be anticipated to some extent that the thermoplastic resin having plasticity at room temperature used in the adhesive layer would be able to reduce external shock in use at room temperature by its own plastic deformation. Investigations of the present inventors have shown that by adjusting the thickness of the adhesive layer to not more than about 200 microns, preferably about 40 to about 100 microns, the plastic deformation which may be generated at the time of reducing external shock scarcely remains in the adhesive layer, and therefore, a laminated panel can be provided which does not have a mechanical strain or optical distortion and is free from deformation or cracking even after it has undergone shock.

Preferably, the thermoplastic resin having a softening point of less than about 100° C. and plasticity at room temperature as the adhesive layer in this invention is selected from vinyl acetate homopolymer, isobutylene homopolymer, and copolymers of vinyl acetate or isobutylene with other copolymerizable ethylenic monomers. These resins are used in a substantially plasticizer-free form.

Examples of the copolymers of vinyl acetate or isobutylene and other copolymerizable ethylenic monomers include copolymers of vinyl acetate or isobutylene with ethylene, propylene, styrene, α-methylstyrene, acrylic acid, methacrylic acid, acrylates such as methyl acrylate or ethyl acrylate, methacrylates such as methyl methacrylate or ethyl methacrylate.

Copolymers of vinyl acetate and ethylene and/or acrylic monomers are preferred, and a copolymer of ethylene and vinyl acetate is especially preferred.

The proportion of units derived from vinyl acetate or isobutylene in the copolymer is desirably not more than about 57 mole%, for example about 17 to about 57 mole%, especially about 17 to about 44 mole%, more especially about 24 to about 44 mole% based on the sum of the units derived from vinyl acetate or isobutylene and units derived from the copolymerizable ethylenic monomer.

Of the polymers exemplified hereinabove, polyvinyl acetate, polyisobutylene, and copolymers containing about 17 to 57 mole% of units derived from vinyl acetate are preferred as the adhesive layer.

A vinyl acetate/ethylene copolymer composed of about 17 to about 57 mole%, above all about 24 to about 44 mole%, of units derived from vinyl acetate and about 83 to about 43 mole%, above all about 76 to about 56 mole% of units derived from ethylene is especially advantageous because it has the properties required in this invention and shows plasticity, but does not show crystallinity, at lower temperatures, for example at temperatures of −20° C.

Another characteristic feature of the thermoplastic resin used in this invention is that a plastic flow is caused in the adhesive layer under a lower stress than that on adhesive layers in conventional laminated panels, which are made of polyvinyl butyral or thermosetting resins.

This property with regard to adhesion acts advantageously in reducing external shock, and effectively prevents cracking of a thin glass sheet which may be caused by the excessively high adhesion of the adhesive layer to the glass sheet.

In the present invention, adhesive layers having a shear adhesion strength, a measure of adhesive strength, of about 0.03 to about 30 kg/cm$^2$, are preferably used.

The laminated panel of this invention in which a glass sheet and a plastic sheet are bonded together through the adhesive layer having the aforesaid properties may be provided as a panel of the simplest structure in which one glass sheet is bonded to one plastic sheet through an interlayer of the adhesive resin, or preferably as a panel of the common structure in which two glass sheets are bonded to one plastic sheet located between them through two adhesive layers.

The laminated panel of this invention is described in more detail below with reference to the accompanying drawings.

FIG. 1 shows a longitudinal sectional view of the laminated panel of this invention having the most common structure described above.

In FIG. 1, the reference numeral 3 represents a plastic sheet; 2A and 2B, adhesive layers; and 1A and 1B, glass sheets.

Glass sheets 1A and 1B may be of any suitable material, and have various thicknesses. For application to the usual uses of the laminated panel, for example as safety glasses for vehicles, it is not necessary to use thick glass sheets, and usually glass sheets having a thickness of about 0.2 to about 3 mm may be used.

The adhesive layers 2A and 2B in the laminated panel of this invention have a thickness of not more than about 200 microns, preferably 40 to 100 microns. If the adhesive layer has a thickness of more than about 200 microns, that part of the glass sheet which has undergone external shock locally deforms and easily breaks.

There is no particular limitation on the material of which the plastic sheet 3 is made. For example, polycarbonate resins, acrylic resins, vinyl chloride resins, and styrene resins are suitable. These resins are transparent and have moderate flexibility and strength. Usually, the plastic sheet 3 has a thickness of about 0.5 mm to about 6 mm.

According to one preferred embodiment of this invention, by using a glass sheet having a thickness of about 0.2 mm to about 3 mm, a laminated panel is provided in which the ratio of the total thickness of the glass plates 1A and 1B to the thickness of the plastic sheet 3 is in the range of from 0.1 to 10.0. If this ratio is lower than 0.1, it is difficult for the adhesive layers 2A and 2B to absorb the stress which is generated owing to the difference in the coefficient of thermal expansion between the glass sheet and the plastic sheet. If, on the other hand, this ratio exceeds 10.0, reinforcement of the glass sheet with the plastic sheet cannot be expected. When the thickness of the glass sheet is 2 mm or less, the aforesaid ratio is preferably adjusted to 0.1–1.0. If the thickness of the glass sheet is larger than 2 mm, the above ratio is preferably adjusted to 0.5–10.0.

Figure 2:
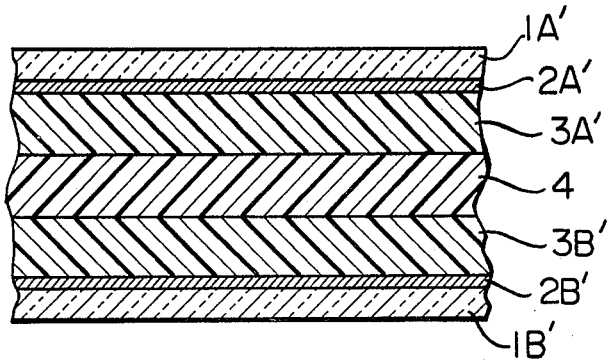

FIG. 2 of the accompanying drawings shows a longitudinal sectional view of another embodiment of the laminated panel of this invention. In FIG. 2, 3A' and 3B' represent plastic sheets; 2A' and 2B', adhesive layers; 1A' and 1B', glass sheets; and 4, a cushioning layer.

The embodiment shown in FIG. 2 differs from the embodiment shown in FIG. 1 in that it further includes the cushioning layer 4 (and therefore two plastic sheets are used). Bonding of the plastic sheets, glass sheets and adhesive layer is as already described above. The cushioning layer serves to absorb the force of shock imparted to the plastic sheet through the adhesive layer and to prevent breakage of the glass sheet which has undergone shock; or to prevent the force of shock from reaching the glass sheet forming the other outermost layer of the laminate and breaking the glass sheet forming the other outermost layer. Desirably, therefore, the cushioning layer is composed of a relatively elastic, adhesive resin, preferably a highly elastic resin having a Young's modulus of not more than 300 kg/cm$^2$, particularly not more than 60 kg/cm$^2$.

Furthermore, the cushioning layer is desirably composed of a highly elastic resin having a damping constant of at least 1 sec$^{-1}$, particularly at least 3 sec$^{-1}$, in order to prevent breakage of the glass sheet forming the outermost layer of the laminate. Larger damping constants mean that the resins have a greater ability to reduce shock they have undergone.

Suitable resins for use as the cushioning layer of this invention include, for example, silicone resins, polyurethane resins, polyvinyl butyral resin containing a plasticizer, and a copolymer of ethylene and vinyl acetate.

Useful silicone resins include polyorganosiloxanes having reactive groups such as SiH, SiCHCH$_2$, SiOH, or SiOR (R=alkyl) which are cured by catalysts for addition-reaction composed mainly of plastinum or palladium. Examples include "SYLGARD-184" (a product of Dow Corning Corporation), "CY52-016" and "CY52-003" (a product of Toray Silicone Co., Ltd.), and "OF-106", "OF-104", "KE-103" and "KE-1551" (a product of Shin-etsu Chemical Co., Ltd.).

The polyurethane resins are, for example, polymers obtained by polymerizing polyether-polyols such as polypropylene glycol or polytetramethylene glycol and polyesters such as adipic esters as a polyol component and aliphatic or alicyclic isocyanates such as hexamethylene diisocyanate or its derivatives or aromatic isocyanates such as 2,4-/2,6-toluene diisocyanate or 1,5-naphthalene diisocyanate as an isocyanate component. Those prepared by using aliphatic or alicyclic polyisocyanates as the isocyanate component are preferred because their yellowing with time is reduced.

The polyvinyl butyral resin is, for example, one containing 15 to 20% by weight of hydroxyl groups and 0 to 4% by weight of acetate groups and the remainder being butyral groups, and contains as a plasticizer 20 to 45 parts, per 100 parts by weight of the resin, triethylene glycol di-2-ethyl butyrate or dibutyl sebacate or dihexyl adipate or dioctyl adipate.

A preferred species of the ethylene/vinyl acetate copolymer is one containing about 17 to about 57 mole%, based on the entire structural units, of units derived from vinyl acetate already exemplified hereinabove as the thermoplastic resin for forming the adhesive layer.

As can be appreciated from the foregoing description, the laminated panel of this invention including a cushioning layer is characterized by having such a structure that a shock exerted externally is absorbed by the cushioning layer. Accordingly, most basically, this laminated panel consists of a glass sheet 1A' forming an outermost layer, an adjacent adhesive layer 2A', an adjacent plastic sheet 3A', an adjacent cushioning layer 4 and an adjacent plastic sheet 3B' forming another outermost layer.

Figure 3:
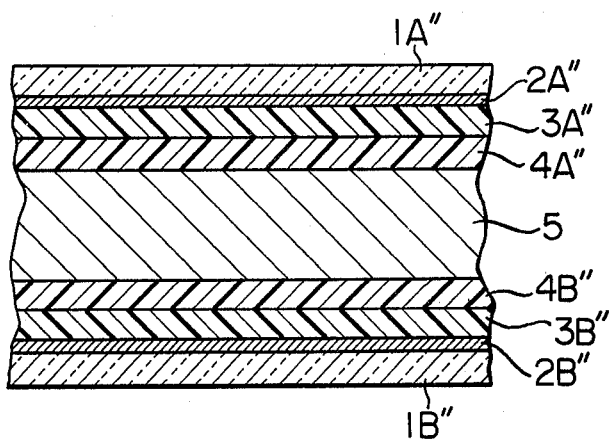

A further developed embodiment of the laminated panel of this invention having a cushioning layer is shown in FIG. 3.

In FIG. 3, the reference numerals 1A" and 1B" represent a glass sheet; 2A" and 2B", adhesive layers; 3A" and 3B", plastic sheets, 4A" and 4B", cushioning layers; and 5, another sheet-like material.

The embodiment shown in FIG. 3 differs from that shown in FIG. 2 in that it further has the other sheet 5 (therefore, two cushioning layers are used). The plastic sheet, the glass sheet, the adhesive layer and the cushioning layer are as already described. The laminated panel in accordance with this embodiment having the other sheet-like material has high penetration resistance to shock exerted externally, and therefore bullet penetration resistance can be easily imparted. Even a mechanically weak sheet-like material can be made into a laminated panel having practical strength because it is protected on both sides with cushioning layers, plastic sheets and glass sheets.

As the other sheet-like material, there can be used not only plastic sheets of the same materials as the aforesaid plastic sheets. Other plastic sheets, glass sheets, and metal sheets can also be used.

The laminated panel shown in FIG. 3 having the same structure on both sides of the other sheet-like material resists shock in the same way whichever outermost layer is subject to shock. A laminated panel having a cushioning layer, one outermost layer of which consists of a plastic sheet, resists shock in the same way as in the embodiment shown in FIG. 3 only when the shock is exerted on the surface of the glass sheet forming the other outermost layer.

The individual members of the laminated panel of this invention, i.e. the glass sheet, plastic sheet, adhesive layer, and optionally cushioning layer and other sheet-like material, can be used either as colored or non-colored transparent members, or as colored or non-colored non-transparent members. Preferably, these members are transparent, and by using these transparent members, a transparent laminated panel can be provided.

The laminated panel of this invention can be produced by providing an adhesive layer having a thickness of not more than about 200 microns composed of a thermoplastic resin having a softening point of not more than about 100° C. and being substantially free of a plasticizer and being plastic at room temperature, on the surface of either one of a glass sheet and a plastic sheet to be bonded, or filling the aforesaid adhesive into a space between a glass sheet and a plastic sheet located a predetermined distance from each other, than maintaining the assembly at a temperature higher than the softening point of the thermoplastic resin, usually at a temperature about 1° to about 30° C. higher than the softening point, and a pressure of 1 to 15 kg/cm$^2$ for a period of about 1 to about 30 minutes, and cooling the product to room temperature under pressure, or after or while releasing the pressure.

The adhesive layer can be provided, for example, by coating the adhesive. When the adhesive is solid at room temperature, it may be provided by using a film of the adhesive molded to the desired thickness.

The laminated panel of this invention having a cushioning layer can be produced by making a material composed of a bonded structure of glass sheet/adhesive layer/plastic sheet in the above manner, and bonding it to a cushioning layer; or first making a material composed of a plastic sheet/cushioning layer/plastic sheet and bonding it to a glass sheet by an adhesive as described above; or bonding a glass sheet, and a plastic sheet by means of an adhesive and a cushioning layer.

Bonding by a cushioning layer can be achieved without the aid of another adhesive when the highly elastic resin forming the cushioning layer is adhesive to the plastic sheet. If the highly elastic resin forming the cushioning layer is non-tacky or non-adhesive, the bonding can be achieved with the aid of another adhesive, for example a thermoplastic resin of the same type as used in forming the adhesive layer.

Since all of the resins exemplified above as the highly elastic resin forming the cushioning layer generally have sufficient tackiness or adhesiveness for bonding plastic sheets, bonding by the cushioning layer usually does not require the use of other adhesives.

Accordingly, the bonding by the cushioning layer can generally be achieved by superimposing a layer of the highly elastic resin or its precursor on at least one of the plastic sheets to be bonded, or filling the highly elastic resin or its precursor into the space between two plastic sheets located a predetermined distance from each other, then heat sealing the assembly or converting the precursor into a highly elastic resin at a pressure of about 5 kg/cm$^2$ to about 15 kg/cm$^2$, and then cooling the product to room temperature under pressure or affter releasing the pressure.

For example, when a silicone resin or polyurethane resin is desired as the highly elastic resin for use as the cushioning layer, a precursor of such a resin, that is a prepolymer thereof having flowability, can be used. When a polyvinyl butyral resin is desired, it can be used as a film molded in the predetermined thickness. When an ethylene/vinyl acetate copolymer is desired, a viscous solution of the copolymer can be used.

Silicone resins or polyurethane resins can be easily obtained as two-package type prepolymers. They cure into highly elastic resins at room temperature or at a moderately elevated temperature. The polyvinyl butyral resin can be heat sealed by heating it to a temperature of, for example, about 110° to about 130° C. The ethylene/vinyl acetate copolymer can be heat sealed by heating it to the temperature described hereinabove.

Bonding by the adhesive layer and bonding by the cushioning layer can be performed simultaneously or separately as mentioned above. However, when the temperature required to bond a glass sheet to a plastic sheet by the adhesive layer is lower than the temperature required to bond plastic sheets by the cushioning layer and exceeds about 120° C., it is preferred to bond the plastic sheets first and then to bond the bonded assembly to a glass sheet. As a result, the properties required of the adhesive layer in this invention are fully exhibited, and the strain owing to the difference in the coefficient of thermal expansion between the glass sheet and the plastic sheet can be minimized.

Thus, according to this invention, there is provided a laminated panel having reduced residual strain and good resistance to external shock which can be suitably used in vehicles and building and construction materials.

For example, a laminated panel in which both outermost layers are composed of a glass sheet can be used directly in vehicle or buildings. Furthermore, a laminated panel in which one outermost layer is a glass sheet and the other outermost layer is a plastic sheet can be used in the aforesaid applications either directly or after forming a coating of SiO$_2$, etc. on the surface of the plastic sheet. Or two laminated panels may be located in a spaced apart relationship with the plastic sheet-side directed inward, and may be used in the above applications as a so-called double-glazing glass unit.

According to this invention, a laminated panel of the above structure which further has the ability to shield light and reflect heat rays can be provided.

The laminated panel having such an ability is characterized in that a structural portion which exhibits such a function is not provided on the outermost layer of glass or plastic, but is present inside the laminated panel. Thus, since the structural portion exhibiting such a function is not directly exposed to the outside air, the laminated panel of this invention having such a function has the advantage of retaining this function stably over long periods of time.

Such a laminated panel in accordance with this invention is a laminated panel in which a plurality of films or woven or knitted fabrics having light-shielding ability are embedded substantially parallel to each other at some angle to the outside surface of the panel in the plastic sheet, cushioning layer or other sheet-like material, and which has a light-shielding function and it transparent when viewed substantially parallel to the angle of embedding of the films.

In another embodiment, it is a laminated panel in which a layer having the function of reflecting heat rays is provided on the inside surface of a glass sheet or plastic sheet facing the adhesive layer, or the inside surface of a plastic sheet facing the cushioning layer or on the inside surface of the other sheet-like material facing the cushioning layer, and which is transparent and has the ability to reflect heat rays.

Figure 4:
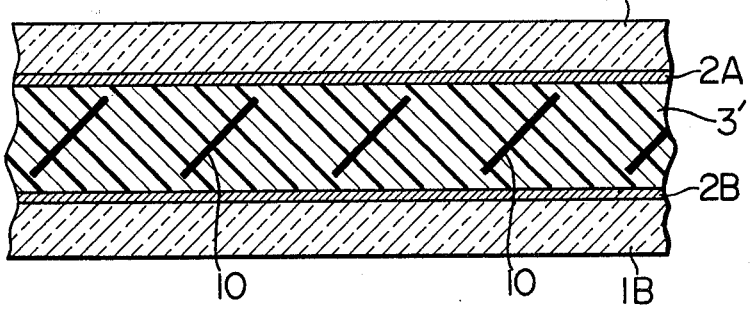

FIG. 4 of the accompanying drawings is a longitudinal sectional view of one embodiment of the laminated panel having light-shielding ability. In FIG. 4, the reference numerals 1A and 1B represent glass sheets; 2A and 2B, adhesive layers; and 3', a plastic sheet having embedded therein films or woven or knitted fabrics 10.

The embodiment shown in FIG. 4 corresponds to the embodiment shown in FIG. 1. It will be easily appreciated that the laminated panel having a light-shielding function is likewise present. In the embodiment shown in FIG. 2, the films or woven or knitted fabrics having a light-shielding function can be embedded in any one of the plastic sheet 3A' or 3B' or the cushioning layer 4. In the embodiment of FIG. 3, such films or fabrics can be embedded in any one of the plastic sheet 3A" or 3B", the cushioning layer 4A" or 4B" or the other sheet-like material (in this case, limited to a plastic sheet-like material).

Examples of the films having light-shielding function include films of metals such as aluminum, palladium, gold, silver, copper, iron, nickel, chromium, lead or tin, films of metal alloys, films of metal oxides such as indium oxide or tin oxide, colored non-transparent plastic films colored by organic or inorganic pigments, thin films of wood, and paper sheets.

Instead of the films having light-shielding ability, woven or knitted fabrics may be used. Examples are woven or knitted fabrics of polyester fibers, polyamide fibers, polypropylene fibers acrylic fibers, cellulose acetate fibers, glass fibers, carbon fibers, cotton, and wool. Preferably, the mesh openings of these woven or knitted fabrics are dense to such an extent that the desired light-shielding function is imparted.

When the films or knitted or woven fabrics having a light-shielding function are composed of a material having electric conductivity, such as metal films or woven or knitted fabrics or carbon fibers, an electric current may be passed through them. Heat generation by passing current prevents clouding of the surface of glass by dew formation.

FIGS. 5-a, 5-b and 5-c are cross-sectional views showing the process for embedding films or knitted or owven fabrics having light-shielding ability in a plastic sheet.

FIG. 5-a shows a mold 20 having a sawtooth-like cross section. A resin for forming the plastic sheet 3' (see FIG. 4) in accordance with this invention is poured into the mold 20. When the resin is a thermoplastic resin, it is then cooled and solidified. When it is a thermosetting resin, it is heated and solidified, followed by cooling. Thus, the sawtooth-like sheet 3'A shown in FIG. 5-b is produced. Then, as shown in FIG. 5-b, films or woven or knitted fabrics 10 having light-shielding ability are bonded to the same side surfaces of the sawtooth-like sheet 3A'. The resulting assembly is placed in a recessed plate-like mold 21 shown in FIG. 5-c, and a resin (usually the same type of resin as used to form the sawtooth-like sheet 3'A) is poured into the mold 21 and solidified or cured in the same way as above. Thus, a sheet having films or fabrics having a light-shielding function embedded therein can be produced.

FIG. 6 is a longitudinal sectional view of one embodiment of the laminated panel having the ability to reflect heat rays. In FIG. 6, the reference numerals 1A' and 1B' represent glass sheets; 2A' and 2B', adhesive layers; 3A' and 3B', plastic sheets; 4, a cushioning layer; and 6, a layer having the ability to reflect heat rays.

The embodiment shown in FIG. 6 corresponds to the embodiment shown in FIG. 2. It will be appreciated that a laminated panel having the ability to reflect heat rays can also be made with respect to the embodiments shown in FIGS. 1 and 3. In FIG. 6, the layer having the ability to reflect heat rays is located adjacent to the glass sheet 1A'. But its position is not limited to this. For example, it may be located adjacent to the glass sheet 1B'. Or it may be located adjacent to that surface of the plastic sheet 3A' or 3B' which faces the cushioning layer 4', or that surface of the plastic sheet 3A' or 3B' which faces the adhesive layers 2A' or 2B'.

A film having the ability to reflect heat rays can be provided adjacent to the plastic sheet 3 or to that surface of the glass sheet 1A or 1B which faces the adhesive layer in the embodiment of FIG. 1. In the embodiment of FIG. 3, it may be provided adjacent to that surface of the glass sheet 1A" or 1B" which faces the adhesive layer, or to that surface of the plastic sheet 3A" or 3B" which faces the adhesive layer, or to that surface of the plastic sheet 3A" or 3B" or the other sheet-like material 5 which faces the cushioning layer.

The layer having the ability to reflect heat rays can be provided, for example, by depositing a metal in a thin film (e.g., about 20 to about 3000 Å thick) on a glass sheet by a chemical means such as plating, or depositing a metal in a thin film on the glass sheet by physical means such as vacuum deposition. By using such a glass sheet in such a way that its metal-deposited surface faces inward, a laminated panel of the structure shown in FIG. 6 can be provided by the present invention.

The layer having the ability to reflect heat rays may be a plastic film having a metal vacuum-deposited thereon. Such a plastic film having the ability to reflect heat rays is readily available commercially. For example, a polyester film having aluminum metal vacuum-deposited thereon can be used.

In the production of the laminated panel of this invention using such a plastic film having the ability to reflect heat rays, the heat ray-reflecting film may be bonded to a glass sheet or plastic sheet by using a known adhesive or the resin forming the adhesive layer used in this invention.

As can be seen from the foregoing description, the present invention can also provide a laminated panel having films or woven or knitted fabrics having light-shielding ability and a layer having the ability to reflect heat rays.

The light-shielding laminated panel in accordance with this invention is used suitably as windowpanes of vehicles and buildings which require light shielding, or as outdoor display plates. The laminated panel having the ability to reflect heat rays can be suitably used as heat insulating wall materials, windowpanes of vehicles, partitions, etc. in order to prevent incoming of heat rays from outside or dissipation of heat rays to the outside.

The following Examples illustrate the present invention in greater details. It should be understood that these examples are intended for illustrative purposes, and do not in any way limit the scope of the present invention.

The adhesion strength of the resin used to form the adhesive layer in this invention is measured by the method set forth in ASTM D1002 at a pulling speed of 50 mm/min. The thickness of the adhesive layer smaple was 50 microns.

EXAMPLE 1

A glass sheet, 300 mm × 300 mm × 1 mm in size, was provided. One surface thereof was washed successively with acetone, deionized water and alcohol. The cleaned surface was heated to about 100° C., and a 30% toluene solution of a copolymer composed of 60% by weight of vinyl acetate units and 40% by weight of ethylene units was sprayed uniformly on the heated surface using a spray gun to form a layer of the copolymer having a thickness of 0.06 mm.

Separately, a polycarbonate sheet, 300 mm×300 mm33 2 mm, was provided, and both of its surfaces were washed with ethyl alcohol.

One such polycarbonate sheet was sandwiched between two such glass sheets having the copolymer layer formed thereon. The assembly was pressed by a roll at 100° C., the air in the assembly was removed, and the assembly was further treated in an autoclave for 30 minutes at 120° C. and 13 kg/cm$^2$.G.

The resulting laminated panel was cooled to room temperature, and examined for optical distortion. Scarcely any optical distortion was observed.

The laminted panel was placed horizontal on a wooden frame, and a steel ball having a weight of 225 g was let fall onto the panel from a height of 2.3 m. The glass sheets as the outermost layers of the panel did not break. When the panel was heated to 100° C., no change was seen therein.

The copolymer used in the adhesive layer had a softening point of 91° C., was plastic at ordinary temperatures, and had an adhesion strength of 8 kg/cm$^2$.

EXAMPLE 2

A sheet (300 mm×300 mm×2 mm) of silicone resin ("SYLGARD-184", a product of Dow Corning Corporation) was provided between two polycarbonate sheets (300 mm×300 mm×2 mm), and treated at 120° C. for 30 minutes to form a polycarbonate sheet having an interlayer of silicone resin.

Separately, pellets of an ethylene/vinyl acetate copolymer (composed of about 45% by weight of ethylene and about 55% by weight of vinyl acetate; softening point about 78° C.) were heated to 100° C., extended to a thickness of 0.05 mm, and cooled to form a film.

The resulting film was placed adjacent to each of the outside surfaces of the polycarbonate sheet having an interlayer of silicone resin, and a glass sheet having a thickness of 0.6 mm was superimposed on each outside surface of the resulting structure. The assembly was pressed by a roll while being heated at 100° C., and further treated at 110° C. and 13 kg/cm$^2$ for 30 minutes.

The resulting laminated panel was cooled to room temperature. Neither a mechanical strain nor an optical distortion was observed in the resulting panel.

In the same way as in Example 1, a steel ball having a weight of 225 g was let fall onto the laminated panel from a height of 2.3 m. The glass sheets in the laminated panel did not break.

EXAMPLE 3

A silicone resin ("OF-106", a trademark for a product of Shin-etsu Chemical Co., Ltd.) was poured into a mold of the same type as shown in FIG. 5-a having a sawtooth-like cross section and grooves of 2 mm in depth provided at a pitch of 4 mm, and heated and solidified to form a resin sheet having a size of 100 mm×100 mm and a sawtooth-like corss-section. An aluminum film having a length of 100 mm, a width of 2.8 mm and a thickness of 30 microns was bonded to each of the ridges of the sheet by means of the same silicone resin as above. The sheet was then placed in a plate-like recessed mold having a size of 100 mm×100 mm×2 mm of the same type as shown in FIG. 5-c, and the same silicone resin as above was poured into the mold from above, and heated and solidified to produce a cushioning layer having a size of 100 mm×100 mm×2 mm.

A polycarbonate sheet having a size of 100 mm×100 mm and a thickness of 2 mm was bonded to both surface outside surfaces of the cushioning layer using the same silicone resin as above. Then, an adhesive layer (composed of an ethylene/vinly acetate copolymer consisting of about 59% by weight of ethylene and about 41% by weight of vinyl acetate; softening point about 77° C.) having a thickness of 0.05 mm was provided on both outside surface of each of the polycarbonate sheets. Furthermore, a glass sheet having a size of 100 mm×100 mm×1 mm was superimposed on the adhesive layer. The assembly was heated to 100° C., pressed by a roll, and further heated at 110° C. and 10 kg/cm$^2$ for 30 minutes to produce a laminated panel.

This laminated panel showed a good light-shielding effect. When the laminated panel was placed horizontal on a wooden frame, and a steel ball weighing 225 g was let fall onto the panel from a height of 2.5 m, no breakage was seen on the outermost glass sheets. Thus, it was ascertained that this laminated panel had higher break strength than a commercially available laminated glass composed of two glass sheets having a thickness of 2.3 mm bonded to each other through an interlayer of resin.

EXAMPLE 4

Aluminum was vacuum-deposited on one surface of a glass sheet having a size of 300 mm×300 mm×1.0 mm, and a toluene solution of the same vinyl acetate/ethylene copolymer as used in Example 1 was coated on the aluminum-deposited surface of the glass sheet using a spray gun to form a coated film having a thickness of about 0.06 mm.

The same polycarbonate sheet having an interlayer of silicone resin as produced in Example 2 was superimposed on the coated surface of the glass sheet. The assembly was pressed by a roll at a temperature of about 100° C., and then treated in an autoclave at 120° C. and 13 kg/cm$^2$.G for 30 minutes, and then cooled to room temperature.

The resulting laminated panel exhibited moderate light-transmitting property and high reflection of heat rays, and showed impact strength, equal to, or higher than, a laminated glass composed of two glass sheets having a thickness of 5 mm.

EXAMPLE 5

A polyethylene terephthalate film having aluminum vacuum-deposited thereon was bonded to one surface of a glass sheet having a size of 300 mm×300 mm×0.6 mm using an acrylic emulsion adhesive (70% by weight of 2-ethylhexyl acrylate, 29% by weight of vinyl acetate and 1% by weight of acrylic acid).

Separately, a polyurethane resin (composed mainly of 100 parts by weight of polyester-polyol and 8 to 10 parts by weight of 2,4/2,6-toluene diisocyanate; "POLYLITE OD-X106", a product of Dainippon Ink and Chemicals Inc.) was poured into the space between two polycarbonate resin sheets having a size of 300 mm×300 mm×2 mm, and heated at 100° C. for 1 hour to form a polycarbonate laminated sheet having an interlayer of polyurethane (thickness 2 mm).

An adhesive resin composed of an ethylene/vinyl acetate copolymer (composed of 45% by weight of ethylene and 55% by weight of vinyl acetate) was coated to a thickness of 0.06 mm on the aluminum-deposited surface of the glass sheet.

The polycarbonate sheet was sandwiched between two such glass sheets, and the assembly was heated to 100° C. and roll pressed by a roll, and further heat-treated at 110° C. for 30 minutes at a pressure of 10 kg/cm².G. Then, the laminate was cooled to about 40° C., and the pressure was reduced.

The resulting laminated panel had an equivalent heat ray reflectance to commercially available highly heat ray reflective glasses, and showed an impact strength equal to, or greater than, a laminated glass obtained by bonding glass sheets having a thickness of 5 mm.

What we claim is:

1. A laminated panel consisting of a glass sheet forming an outermost layer having a thickness of 0.2 to 2 mm, an adhesive layer having a thickness of 40 to 100 microns and composed of a thermoplastic resin having a softening point of less than about 100° C., containing substantially no plasticizer and being plastic at room temperature, a first plastic sheet having a thickness of 0.5 to 6 mm, a cushioning layer and a second plastic sheet having a thickness of 0.5 to 6 mm, said glass sheet being bonded to one surface of said first plastic sheet through said adhesive layer, and the other surface of said first plastic sheet being bonded to one surface of said second plastic sheet through said cushioning layer, said cushioning layer being composed of a resin selected from the group consisting of silicone resins, polyurethane resins, and a copolymer of ethylene and vinyl acetate, said first plastic sheet and second plastic sheet being composed of a resin selected from the group consisting of acrylic resins, vinyl chloride resins and styrene resins.

2. The laminated panel of claim 1 wherein said cushioning layer is composed of a silicone resin or a polyurethane resin.

3. The laminated panel of claim 1 wherein the resin of said cushioning layer has a Young's modulus of not more than 300 kg/cm².

4. The laminated panel of claim 3 wherein the resin of said cushioning layer has a Young's modulus of not more than 60 kg/cm².

5. The laminated panel of claim 1 wherein the resin of said cushioning layer has a damping constant of at least 1 sec$^{-1}$.

6. The laminated panel of claim 5 wherein the resin of said cushioning layer has a damping constant of at least 3 sec$^{-1}$.

7. The laminated panel of claim 1 wherein said thermoplastic resin forming said adhesive layer is selected from the group consisting of vinyl acetate homopolymer, isobutylene homopolymer and copolymers of vinyl acetate or isobutylene with other copolymerizable ethylenic monomers.

8. The laminated panel of claim 7 wherein said thermoplastic resin is a copolymer of ethylene, and/or an acrylic monomer, and vinyl acetate.

9. The laminated panel of claim 7 wherein said copolymers of vinyl acetate with other copolymerizable ethylenic monomers contain not more than about 57 mole %, based on the entire structural units, of units derived from vinyl acetate.

10. The laminated panel of claim 9 wherein said copolymers of vinyl acetate with other copolymerizable ethylenic monomers contain about 17 to about 44 mole%, based on the total structural units, of units derived from vinyl acetate.

11. The laminated panel of claim 1 wherein two glass sheets each forming an outermost layer are bonded respectively to one surface respectively of two plastic sheets through an adhesive layer having a thickness of 40 to 100 microns and composed of a thermoplastic resin having a softening point of less than about 100° C., containing substantially no plasticizer and being plastic at room temperature, and the other opposing surfaces of said two plastic sheets are bonded to each other through a cushioning layer.

12. The laminated panel of claim 1 wherein the second plastic sheet forms the other outermost layer.

13. The laminated panel of claim 1 which is transparent.

* * * * *